US006823968B2

(12) United States Patent
Baeumler

(10) Patent No.: US 6,823,968 B2
(45) Date of Patent: Nov. 30, 2004

(54) OIL COLLECTING ARRANGEMENT FOR AN INTERNAL-COMBUSTION ENGINE, PARTICULARLY FOR AN OPPOSED-CYLINDER ENGINE

(75) Inventor: Tobias Baeumler, Leonberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 181 days.

(21) Appl. No.: 10/215,194

(22) Filed: Aug. 9, 2002

(65) Prior Publication Data

US 2003/0042078 A1 Mar. 6, 2003

(30) Foreign Application Priority Data

Aug. 11, 2001 (DE) ........................................ 101 39 709

(51) Int. Cl.[7] ................................................ F16N 31/00
(52) U.S. Cl. ................................ 184/106; 123/196 CP
(58) Field of Search ................................ 184/106, 6.21, 184/6.22; 123/196 R, 196 CP

(56) References Cited

U.S. PATENT DOCUMENTS 4,519,348 A * 5/1985 Hamilton ................ 123/195 C
4,682,672 A * 7/1987 Berger et al. ............... 184/106
5,301,642 A * 4/1994 Matsushiro et al. .. 123/196 AB
5,579,729 A 12/1996 Batzill et al.
6,705,270 B1 * 3/2004 Rau et al. ............... 123/195 C

FOREIGN PATENT DOCUMENTS

| | | | |
|---|---|---|---|
| DE | 4405188 | | 8/1995 |
| GB | 2278400 | | 11/1994 |
| GB | 2279109 | | 12/1994 |
| JP | 58-113517 | * | 6/1983 |
| JP | 58200017 | | 11/1983 |
| JP | 01110820 | | 4/1989 |

OTHER PUBLICATIONS

Search Report.

* cited by examiner

*Primary Examiner*—David M. Fenstermacher
(74) *Attorney, Agent, or Firm*—Crowell & Moring LLP

(57) ABSTRACT

The invention relates to an oil collecting arrangement for an internal-combustion engine having an oil collecting housing arranged below a crankcase in which an oil suction space is constructed and at least one oil collecting space adjoins the oil suction space. The oil suction space is separated from the oil collecting space by at least one wall section in which at least one passage opening is arranged which can be controlled by way of a flap. The part of the wall section provided with the return opening is constructed as a plug-in oil separating wall which is fitted in between guiding ribs provided in the oil collecting housing.

7 Claims, 3 Drawing Sheets

OIL COLLECTING ARRANGEMENT FOR AN INTERNAL-COMBUSTION ENGINE, PARTICULARLY FOR AN OPPOSED-CYLINDER ENGINE

BACKGROUND AND SUMMARY OF THE INVENTION

This application claims the priority of Application No. 101 39 709.7, filed Aug. 11, 2001 in Germany, the disclosure of which is expressly incorporated by reference herein.

The invention relates to an oil collecting arrangement for an internal-combustion engine, particularly for an opposed cylinder engine.

In today's water-cooled 6-cylinder opposed-cylinder engines of the 911 Carrera model series of Dr. Ing. h.c.F. Porsche Company, an oil shut-off (separating) box is provided in the oil guiding housing or in the oil pan, which oil separating box is fastened to the oil pan cover, the oil sump for the lubricating oil supply to the engine being constructed in the oil separating box. The lubricating oil returned from the consuming devices into the oil pan is first guided back outside the oil shut-off (separating) box forming the oil suction space before it flows by way of openings monitored by flaps in the oil shut-off (separating) box into the actual oil suction space. The construction of the oil shut-off (separating) box requires relatively high expenditures. In addition, mainly in the event of lateral accelerations of the vehicle, oil movements within the oil pan are possible which carry the risk that insufficient oil may be present in the oil suction space.

The present invention is therefore based on the object of reducing oil movements within an oil guiding housing or an oil pan. In this case, it should be possible to integrate the constructive implementation in a simple manner into the oil guiding housing.

By means of oil separating walls separating the oil suction space, the oil movements within the oil guiding housing are effectively reduced. The oil transfer from the edge areas surrounding the oil suction space is possible only in a defined manner by way of the openings provided in the oil separating walls.

Additional advantages and advantageous embodiments of the invention are contained in the claims and in the description.

Advantageously, the oil/air separators provided in the oil collecting spaces for defoaming the oil are inserted together with the oil separating walls as a preassembled unit in the oil guiding housing or in the oil pan.

The oil separating walls separating the oil suction space from the oil collecting space are supported in the downward direction by a cover which simultaneously seals off the oil pan or the oil guiding housing in the downward direction.

The invention is suitable particularly for an opposed-cylinder engine with horizontally disposed cylinders, in the case of which the lubricating oil taken in from the cylinder heads is introduced into one oil collecting space respectively adjoining the oil suction space before it flows by way of the openings monitored by flaps, which openings are provided in two oil separating walls fitted into the oil pan, into the actual oil suction space.

Other objects, advantages and novel features of the present invention will become apparent from the following detailed description of the invention when considered in conjunction with the accompanying drawings.

BRIEF DESCRIPTION OF THE DRAWINGS

An embodiment of the invention is explained in detail in the following description and drawings, in which.

DETAILED DESCRIPTION OF THE DRAWINGS

Figure 1:
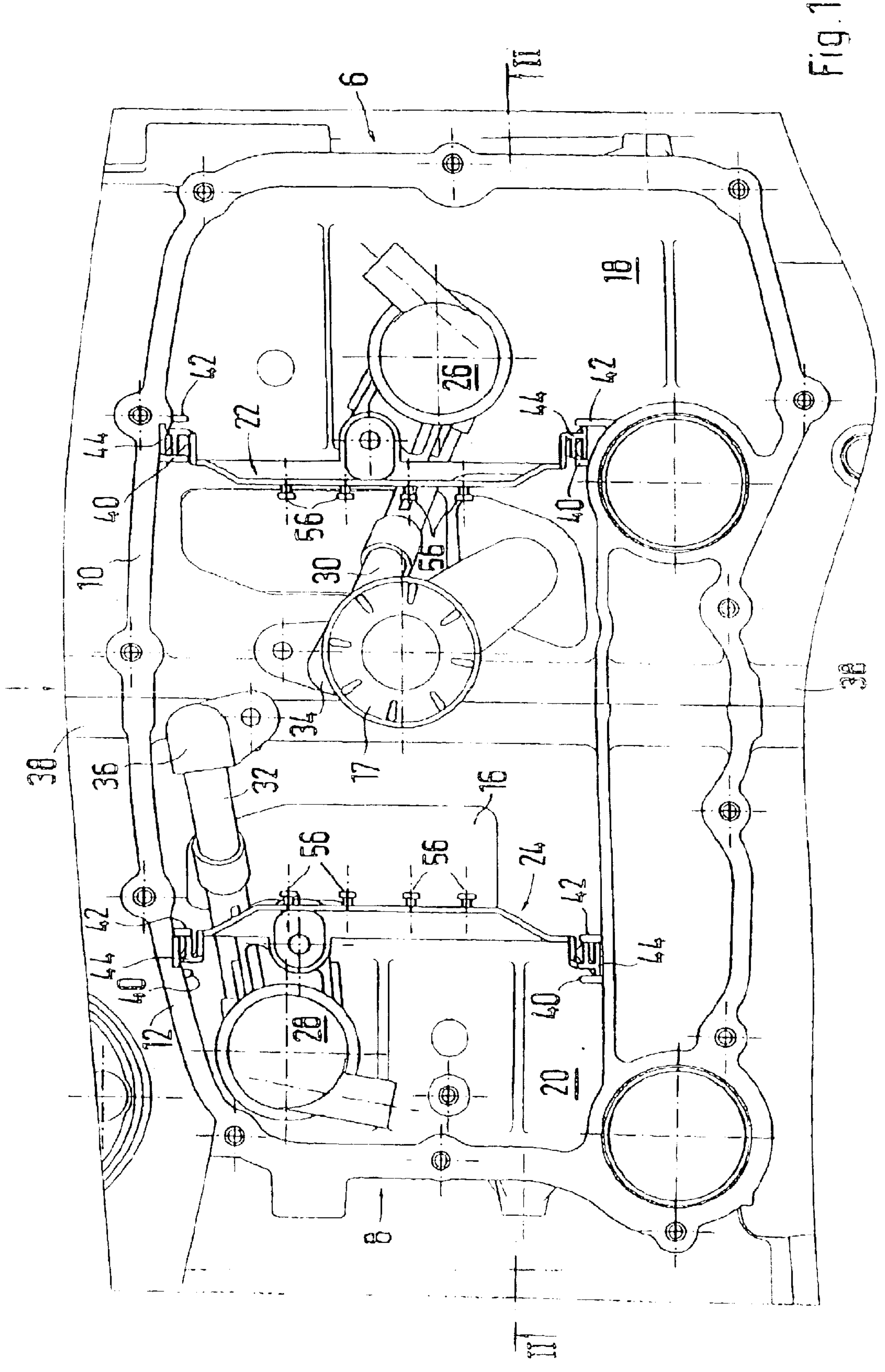
FIG. 1 is a view of the oil guiding housing from below.
Figure 2:
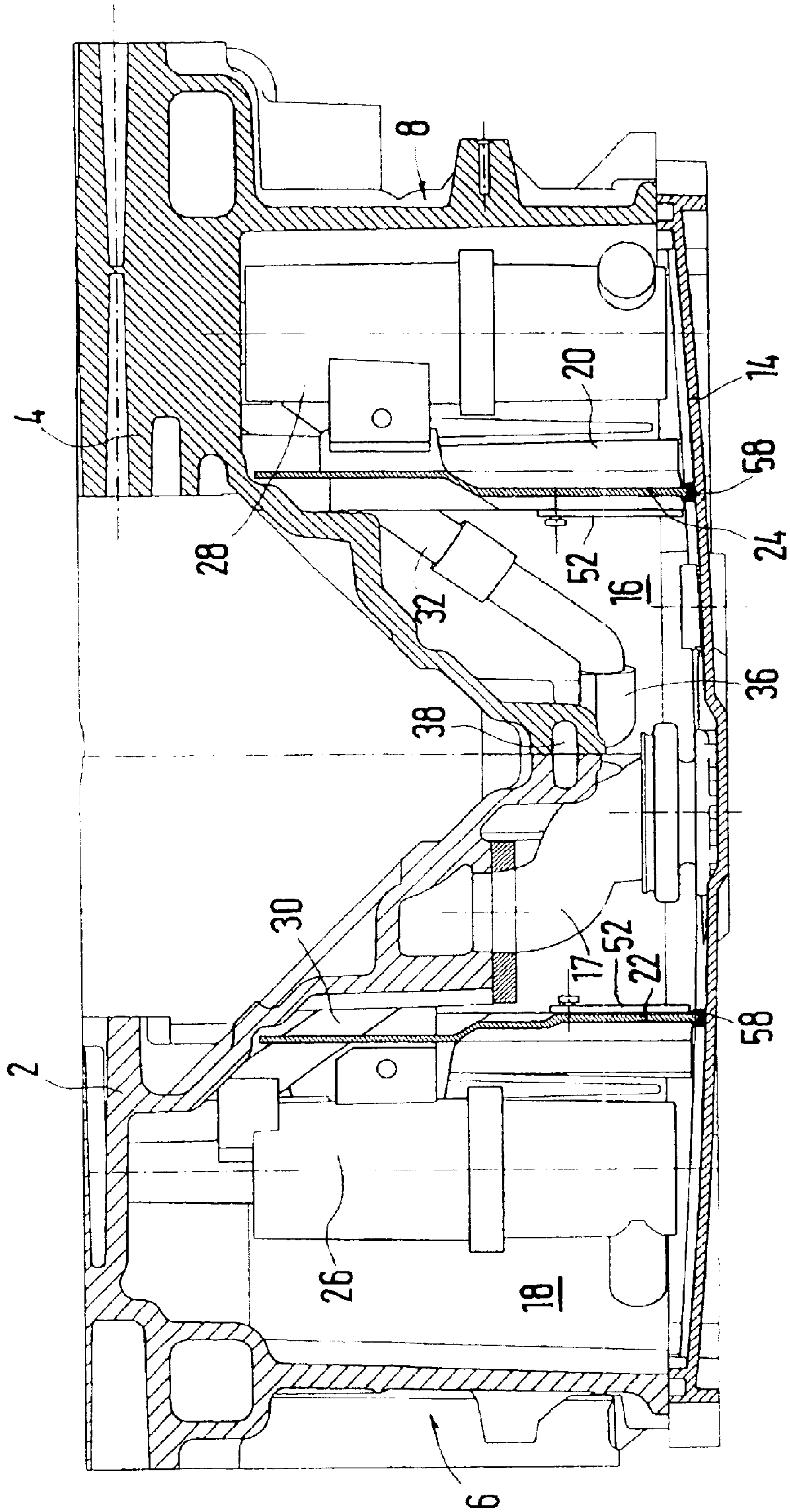
FIG. 2 is a sectional view along Line II—II in FIG. 1.
Figure 3:
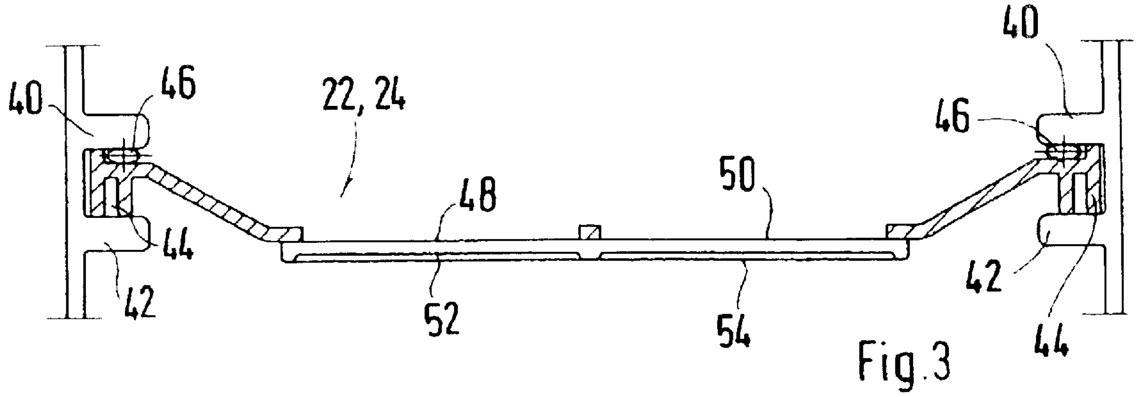
FIG. 3 is a horizontal sectional view of the oil guiding housing in the area of an oil separating wall.
Figure 4:
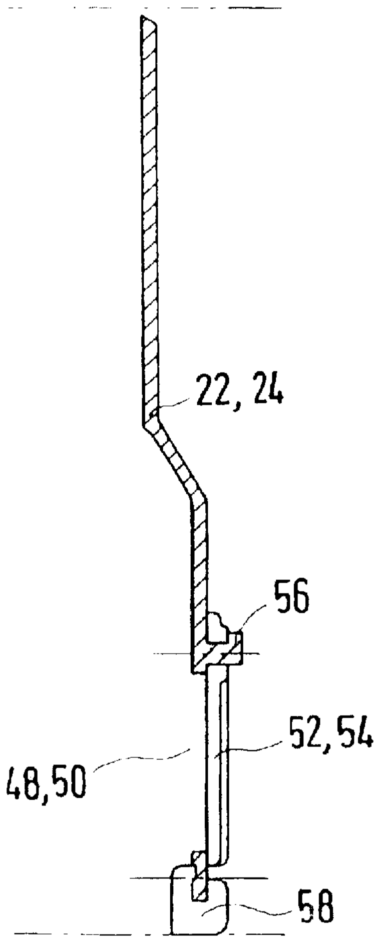
FIG. 4 is a vertical sectional view of the oil guiding housing in the area of an oil separating wall.

The crankcase of a 6-cylinder opposed-cylinder engine shown as a sectional view in FIG. 2 consists, without a restriction to this embodiment, of two crankcase halves 2 and 4 with two horizontally arranged cylinder bank rows (not shown). From each of the two crankcase halves 2 and 4, a downward-extending wall section 6 and 8 is shaped out which, together with an oil cover 14 fastened to the flange surfaces 10 and 12 of the two wall sections 6 and 8, form an oil collecting housing, in the following called an oil pan. The oil pan consists of an oil suction space 16, in which an oil suction snorkel 17 is arranged which leads to a main oil pump which is not shown. On the left and the right of the oil suction space 16, two oil collecting spaces 18 and 20 are constructed which are separated with respect to the oil suction space 16 by two oil separating walls 22 and 24 described in detail in the following. An oil/air separator, a so-called swirl pot 26 and 28, is arranged in the two oil collecting spaces 18 and 20, respectively. An oil pipe 30 and 32, respectively, leads to the two swirl pots 26 and 28, which oil pipes 30 and 32 are connected at their other ends by way of one connection piece 34 and 36, respectively, to two oil return ducts 38 formed by the crankcase halves 2 and 4. FIG. 2 shows the oil return duct 38 for a cylinder bank row. Both oil return ducts formed by the crankcase halves 2 and 4 are separated by a separating wall which is not shown and which is arranged in the area between the two connection pieces 34 and 36.

The two oil separating walls 22 and 24 are fitted in the oil pan. For this purpose, guiding ribs 40 and 42 are provided which are shaped in one piece from the two crankcase halves 2 and 4, into which guiding ribs 40 and 42 the two oil separating walls 22 and 24 are fitted. Corresponding to the guide ribs 40 and 42 provided at the crankcase, the two oil separating walls 22 and 24 are provided in the engaging area with a comb-type guiding structure 44 which is held between the guiding ribs 40 and 42. For the additional sealing-off of the two oil collecting spaces 18 and 20 with respect to the oil suction space 16, a rubber seal 46 is provided between the guiding rib 40 and the rearward side of the comb-type guiding structure 44.

Both oil separating walls 22 and 24 are provided with two window-type passage openings 48 and 50 which are monitored by two flow flaps 52 and 54, respectively, acting as return valves. For the fastening of the flow flaps 52 and 54 opening only into the oil suction space 16, two holding pins 56 respectively fastened to the oil separating walls 22 and 24 are provided for each flow flap 52, 54, on which holding pins 56 the flow flap 52, 54 is disposed. The flow flaps 52, 54 preferably consist of rubber. Between the oil pan cover 14 and the two oil separating walls 22 and 24, which are supported in the downward direction by the oil pan cover 14, a rubber seal 58 is provided for the sealing-off of the two oil collecting spaces 18, 20 with respect to the oil suction space 16.

The oil return into the oil pan takes place in the following manner:

The lubricating oil taken in from the two cylinder heads of the engine is returned by way of the two oil return ducts 38 (oil return flow indicated by means of the arrows) by way of the oil pipes 30, 32 and by way of the two swirl pots 26, 28 into the two oil collecting spaces 18 and 20. By means of the two swirl pots 26 and 28, the oil is defoamed in a known manner; that is, a majority of the gas constituents is discharged by way of the crank space toward the outside. The oil returned into the two oil collecting spaces 18 and 20 can flow by way of the flow flaps 52 and 54 into the actual oil suction space 16. From there, it is returned in a known manner to the consuming devices by way of the main oil pump, which is not shown and whose oil suction pipe 17 reaches into the oil suction space 16.

The two oil separating walls 22 and 24 as well as the swirl pots 26 and 28 provided in the two oil pipes 30 and 32 are constructed in one piece and are inserted as a preassembled unit into the oil pan and are fastened thereto.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An oil collecting arrangement for an internal-combustion engine, particularly for an opposed-cylinder engine, having an oil collecting housing arranged below a crankcase, in which oil collecting housing an oil suction space is constructed from which a lubricating oil is delivered by way of a main oil pump equipped with an oil suction pipe to consuming devices, and at least one oil collecting space adjoining the oil suction space, into which oil collecting space the lubricating oil coming from the consuming devices is returned by way of an oil pipe, the oil suction space being separated from the oil collecting space by at least one wall section in which at least one passage opening is arranged which is controlled by way of a flap, by way of which passage opening the lubricating oil can flow from the oil collecting space into the oil suction space, wherein the wall section provided with the passage opening is constructed as a plug-in oil separating wall which is fitted in between guiding ribs provided in the oil collecting housing.

2. The oil collecting arrangement according to claim 1, wherein an oil/air separator arranged in an oil return duct is provided in the oil collecting space and wherein the oil/air separator forms a preassembled unit with the oil separating wall.

3. The oil collecting arrangement according to claim 1, wherein the oil collecting housing is closed off in a downward direction by an oil cover which supports the oil separating wall in the downward direction.

4. The oil collecting arrangement according to claim 1, wherein, on a left and a right of the oil suction space, an oil collecting space is provided which is separated from the oil suction space by an oil separating wall.

5. An oil collecting arrangement for an internal-combustion engine comprising:

an oil collecting housing;

an oil suction space disposed within the oil collecting housing;

an oil collecting space disposed within the oil collecting housing; and a wall disposed within the oil collecting housing between the oil suction space and the oil collecting space, the wall defines an opening therein, and wherein the wall defines an opening therein, and the oil collecting housing includes a guide rib structure and wherein the wall includes a guiding structure and further wherein the guiding structure is mated with the guide rib structure.

6. The oil collecting arrangement of claim 5, wherein the guide rib structure includes two parallel walls extending in a first direction and wherein the guiding structure includes two parallel walls extending in a second direction and further wherein the first direction is perpendicular to the second direction.

7. The oil collecting arrangement of claim 5 further comprising a seal disposed between the guide rib structure and the guiding structure.

* * * * *